United States Patent [19]

Kojima

[11] Patent Number: 5,541,659
[45] Date of Patent: Jul. 30, 1996

[54] PICTURE SIGNAL CODING/DECODING METHOD AND DEVICE USING THEREOF

[75] Inventor: Yuichi Kojima, Kanagawa, Japan

[73] Assignee: Sony Corporation, Tokyo, Japan

[21] Appl. No.: 232,995

[22] Filed: Apr. 25, 1994

[30] Foreign Application Priority Data

Apr. 26, 1993 [JP] Japan .................. 5-121929

[51] Int. Cl.$^6$ .................................................. H04N 7/137
[52] U.S. Cl. .................................................. 348/398
[58] Field of Search ........................... 348/415, 402, 348/407, 699, 700, 398, 397, 438, 437, 384; H04N 7/137

[56] References Cited

U.S. PATENT DOCUMENTS

| | | | |
|---|---|---|---|
| 4,858,005 | 8/1989 | Lodge ................................. | 348/415 |
| 5,109,451 | 4/1992 | Aono et al. ......................... | 348/397 |
| 5,189,526 | 2/1993 | Sasson ................................ | 348/397 |
| 5,228,028 | 7/1993 | Cucchi et al. ...................... | 348/402 |
| 5,235,420 | 8/1993 | Gharavi ............................. | 348/398 |
| 5,268,755 | 12/1993 | Nishino et al. ..................... | 348/384 |
| 5,351,083 | 9/1994 | Tsukagoshi ........................ | 348/403 |
| 5,402,185 | 3/1995 | De With et al. ................... | 348/407 |

FOREIGN PATENT DOCUMENTS

| | | | |
|---|---|---|---|
| 0502545 | 9/1992 | European Pat. Off. | H04N 7/24 |
| 0588476 | 3/1994 | European Pat. Off. | H04N 7/24 |
| WO92/22166 | 12/1992 | WIPO | H04N 7/24 |

Primary Examiner—Tommy P. Chin
Assistant Examiner—Vu Le
Attorney, Agent, or Firm—William S. Frommer; Alvin Sinderbrand

[57] ABSTRACT

In a picture signal coding/decoding method and a picture signal coding/decoding device, the compressibility and visual picture quality of the picture pattern whose inter field correlation of high frequency decreases and inter field correlation of low frequency remains when slow movement occurs are improved and transmitted. The intra field component separate coding is performed in each field on the first and second fields of picture signal respectively, and by preventing the effect of inter field movement in advance, the dropping of compressibility by the movement is avoided and furthermore, new blocks is constructed by the resultant low frequency components of two fields and since it is so arranged that the component separate coding is performed in the frame, low frequency components which are not easily affected by slow movement can be coded efficiently, and as a result, the compressibility for the picture containing slow movement can be increased.

10 Claims, 12 Drawing Sheets

FIG. 1A
(RELATED ART)
LOW FREQUENCY SEPARATION FILTER

FIG. 1B
(RELATED ART)
HIGH FREQUENCY SEPARATION FILTER

FIG. 1C
(RELATED ART)
LOW FREQUENCY RECONSTRUCTION FILTER

FIG. 1D
(RELATED ART)
HIGH FREQUENCY RECONSTRUCTION FILTER

VERTICAL　　　HORIZONTAL
DIRECTION　　DIRECTION

PICTURE SIGNAL CODING/DECODING METHOD AND DEVICE USING THEREOF

BACKGROUND OF THE INVENTION

1. Field of the Invention

The present invention relates to a picture signal coding/decoding method and a picture signal coding/decoding device, and more particularly, is suitably applied to the case of transmitting picture signals upon, such as, component separate coding by Wavelet transformation using Haar function.

2. Description of the Related Art

Heretofore, in a picture signal transmission system to transmit picture signals to a remote location, e.g., a television conference system used, and a device to record and reproduce picture signals on a video tape recorder and video disc recorder, by effectively coding a significant information by utilizing the correlation of digital picture signals in order to use the transmitting and recording medium effectively, an amount of transmitting information and recording information are decreased and transmitting efficiency and recording efficiency are improved.

In known coding methods to utilize the correlation of picture signals, a method for quantizing and transmitting after separating picture signals into multiple components, such as predictive coding method, orthogonal transform coding system, such as DCT (Discrete Cosine Transform), sub-band coding system and Wavelet transform system is used.

The predictive coding method is easily installed and suitable for coding of fairly low compressibility. However, it has a weak point that worsening of picture quality is apt to be detected when the compressibility is increased. Also, the orthogonal transform coding system, such as DCT, is widely used since high picture quality can be obtained relatively easily with high compressibility. However, there are weak points that noticeable distortion occurs on the border of blocks and the trouble which occurs because the degree of distortion is different in each block is noticeable. Furthermore, in the orthogonal transform coding system with DCT, the large amount of calculation becomes an obstacle for the hardware.

Furthermore, the component separate coding, such as the sub-band coding system and Wavelet transform system, performs quantization after separating picture signal into multiple components, and relatively high compressibility can be obtained and there are few cases where such peculiar distortion occurs. The installation process differs according to the method, but there is the method, such as, Wavelet transform using Haar function, which can be easily constructed.

Wavelet transform method performs component separation recurrently on low frequency components and performs coding on the resultant components i.e., in conformity to its characteristics in each coefficient. And there are filters for separation and reconstruction as filters to use, for example, Haar function, as shown in FIGS. 1A to 1D combining one sample each of delay circuit, multiplier and adder, and there are other various kinds of filters which are properly used according to the purpose.

Furthermore, in case of applying the component separate coding, such as Wavelet transform to the coding of motion picture signals, such as an ordinary television signal in which one frame is constructed by two fields, the intra field separate coding method has higher efficiency for the picture pattern with vigorous motion whereas the intra frame coding has higher efficiency on the still picture pattern or almost stopped picture pattern.

Figure 1A:
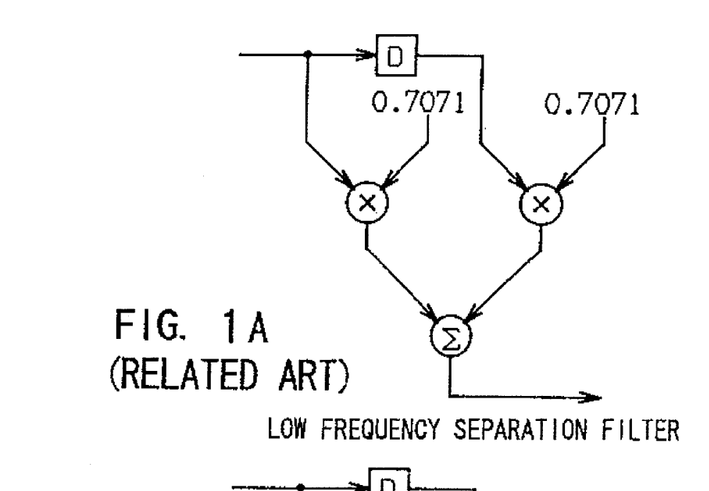
FIGS. 1A to 1D are connection diagrams showing the construction of filter circuit of Wavelet transform using Haar function.
Figure 1B:
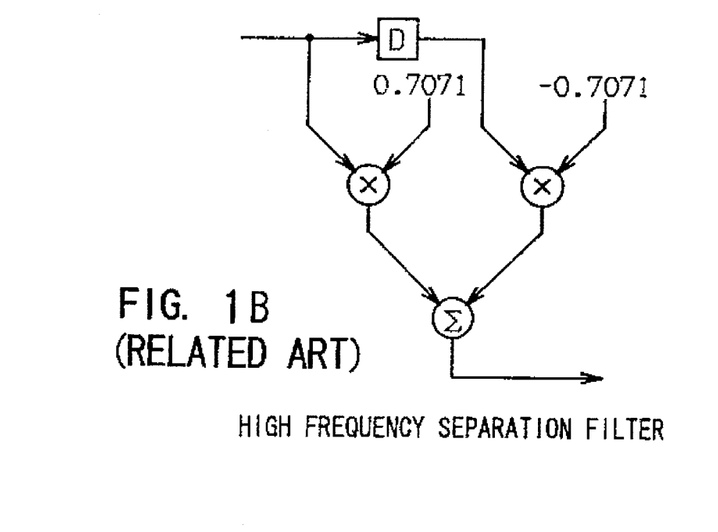
Figure 1C:
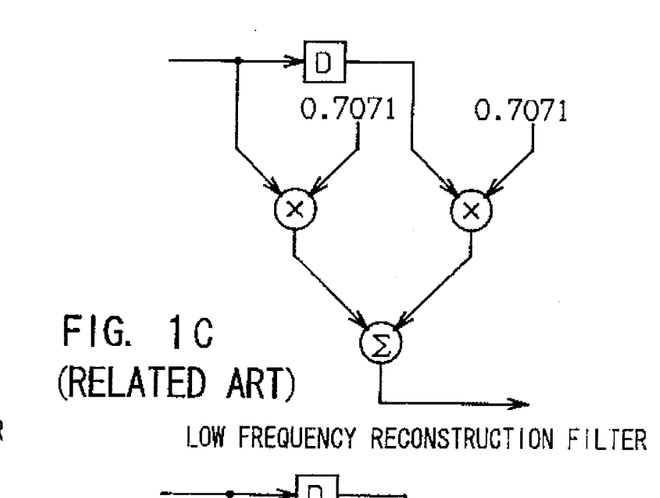
Figure 1D:
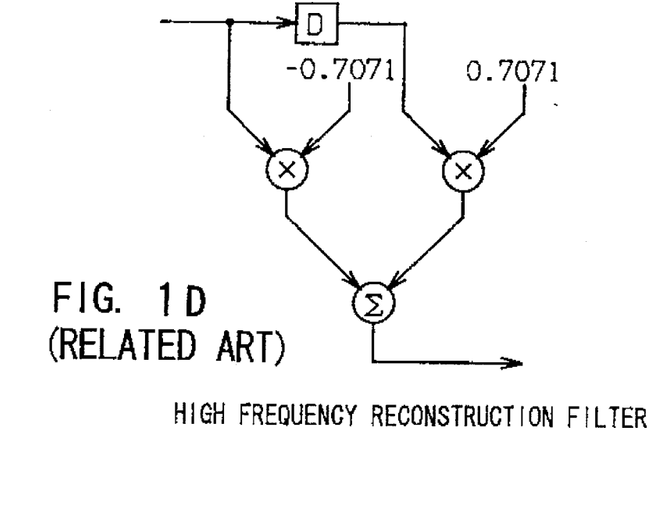
Figure 2:
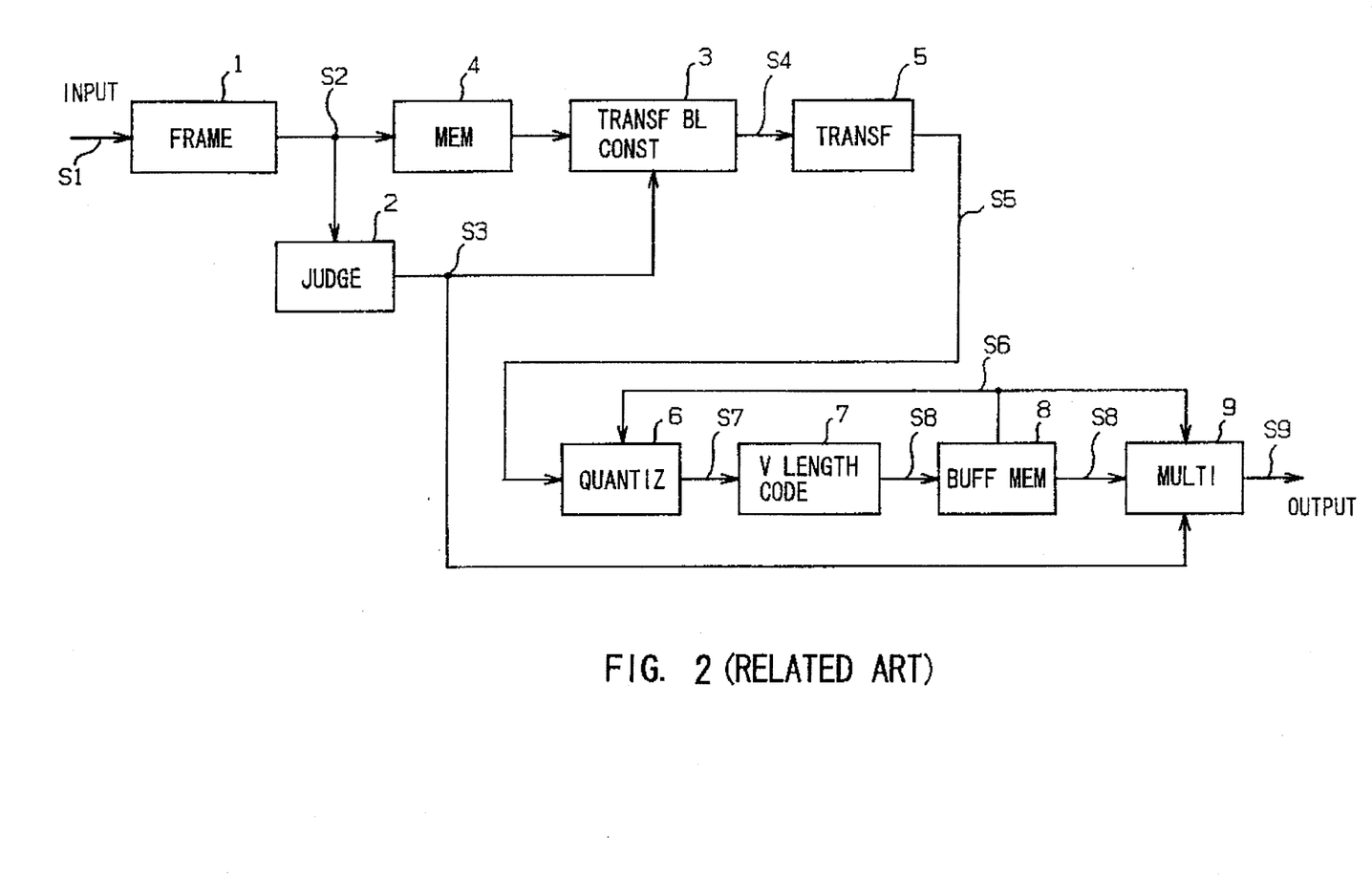
FIG. 2 is a block diagram showing the construction of a picture coding device using Wavelet transform.

Accordingly, in the component separate coding of such as DCT and Wavelet transform using Haar function, the statistical characteristic of picture signal is calculated and the method to shift the intra field coding and the intra frame coding is applied referring to the calculation result. For example, a picture coding device is constructed as shown in FIG. 2.

More specifically, in this picture coding device, input signal S1 is firstly inputted to a framing circuit 1 and frame picture signal S2 in which the first field lines and second field lines are scanned alternatively is formed. This frame picture signal S2 is inputted to a judging circuit 2 which judges either the intra field coding or intra frame coding is suitable. The judging circuit 2 calculates, such as, the correlation of vertical direction of the frame picture signal S2 and in the case where correlation is strong, intra frame coding is selected, and if correlation is weak, blocking shifting information S3 to select the intra field coding is outputted to a transforming block construction circuit 3.

On the other hand, the frame picture signal S2 is inputted to a memory 4 which delays for a time required for processing of the judging circuit 2 and is then inputted to a transforming block construction circuit 3 from memory 4 once it is delayed for the prescribed time. A transforming block construction circuit 3 forms either picture block data for transformation using picture elements in the field only or picture block data for transformation using picture elements in the frame.

Figure 3:
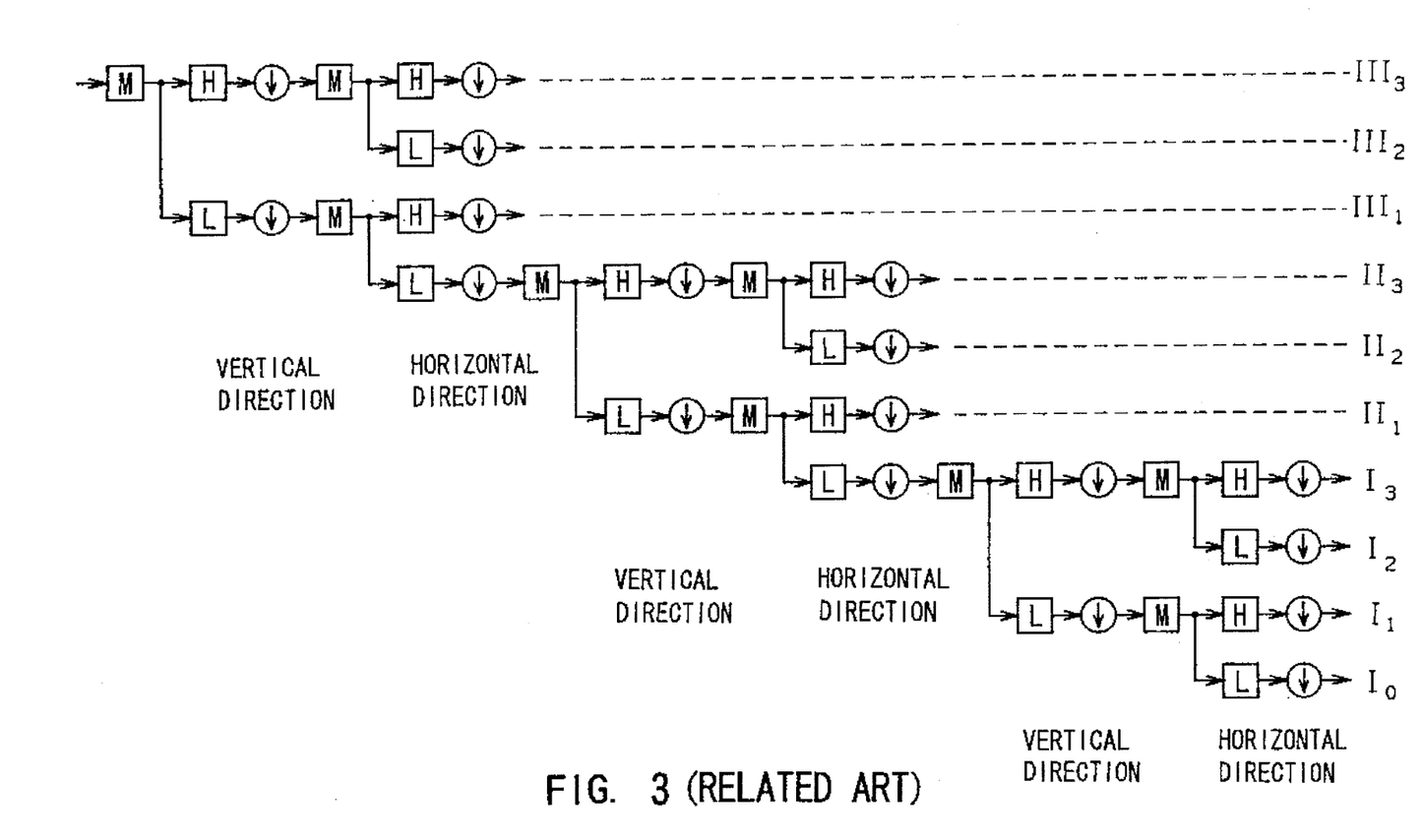
FIG. 3 is a connection diagram showing the construction of two dimensional Wavelet transform circuit.
Figure 4:
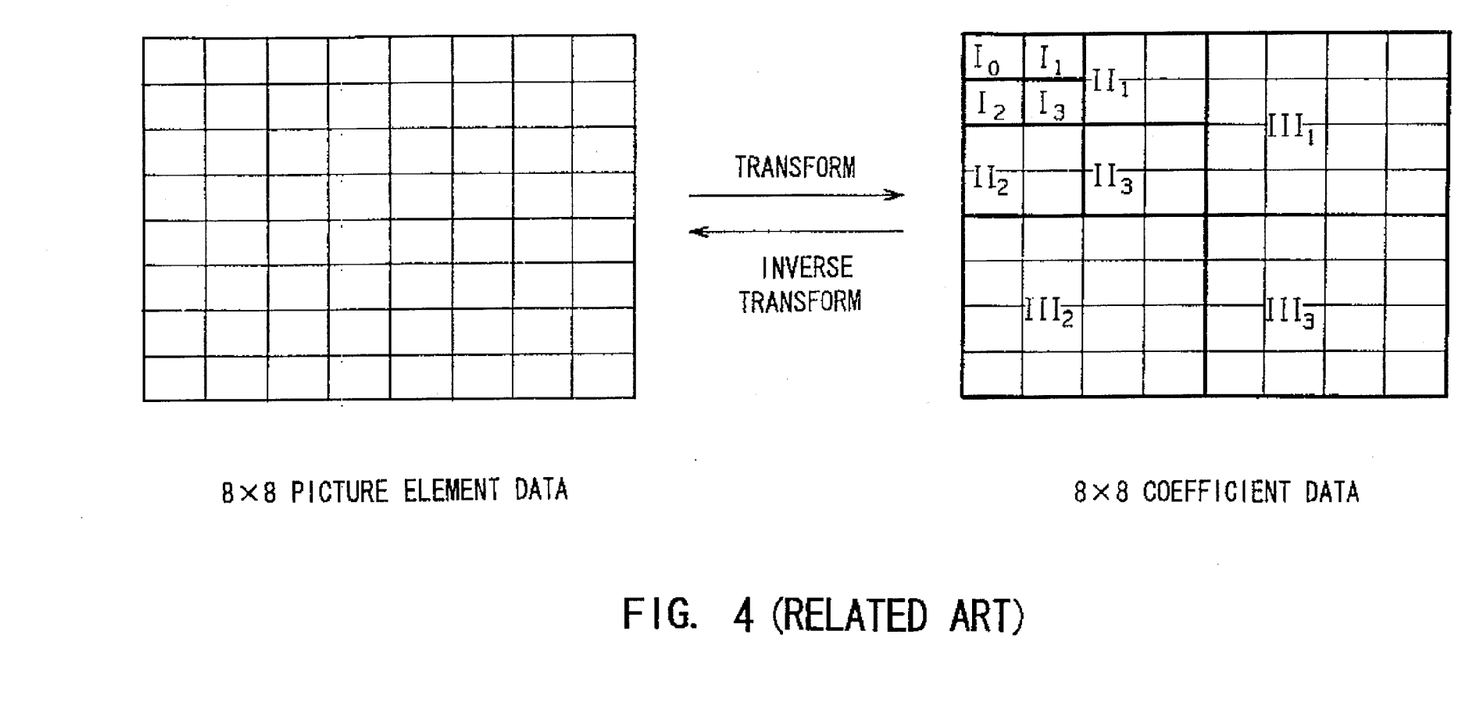
FIG. 4 is a schematic diagram illustrating Wavelet transform and inverse transform using Haar function.

This picture block data for transformation S4 is inputted to the transform circuit 5 and transformed therein to become coefficient S5. This transform circuit 5, as shown in FIG. 3, is composed of 2-dimensional Wavelet transform circuit, divides picture block data for transformation S4 into the high frequency components and the low frequency components and by repeating the down sampling to thin out the resultant samples of both components on every other sample on the low frequency components, performs Wavelet transform utilizing, for example, Haar function as shown in FIG. 4.

Coefficient S5 to be outputted from the transform circuit 5 is inputted to a quantizer 6. At quantizer 6, it is quantized according to quantization step information S6 to show the quantum efficiency to be determined for smoothing the amount of information generated based on the amount of storage of a buffer memory 8 installed at the lower stage. The resultant quantization coefficient S7 is inputted to a variable length coding circuit 7.

At the variable length coding circuit 7, variable length coding, such as Huffman coding and zero run-length coding are combined, is applied and the resultant variable length coding data S8 is inputted to a multiplexer 9 via the buffer memory 8 for smoothing the amount of information generated. And here, it is multiplexed with quantization step size information S6 and blocking shifting information S3 and outputted as output data S9 of the picture coding device.

Figure 5:
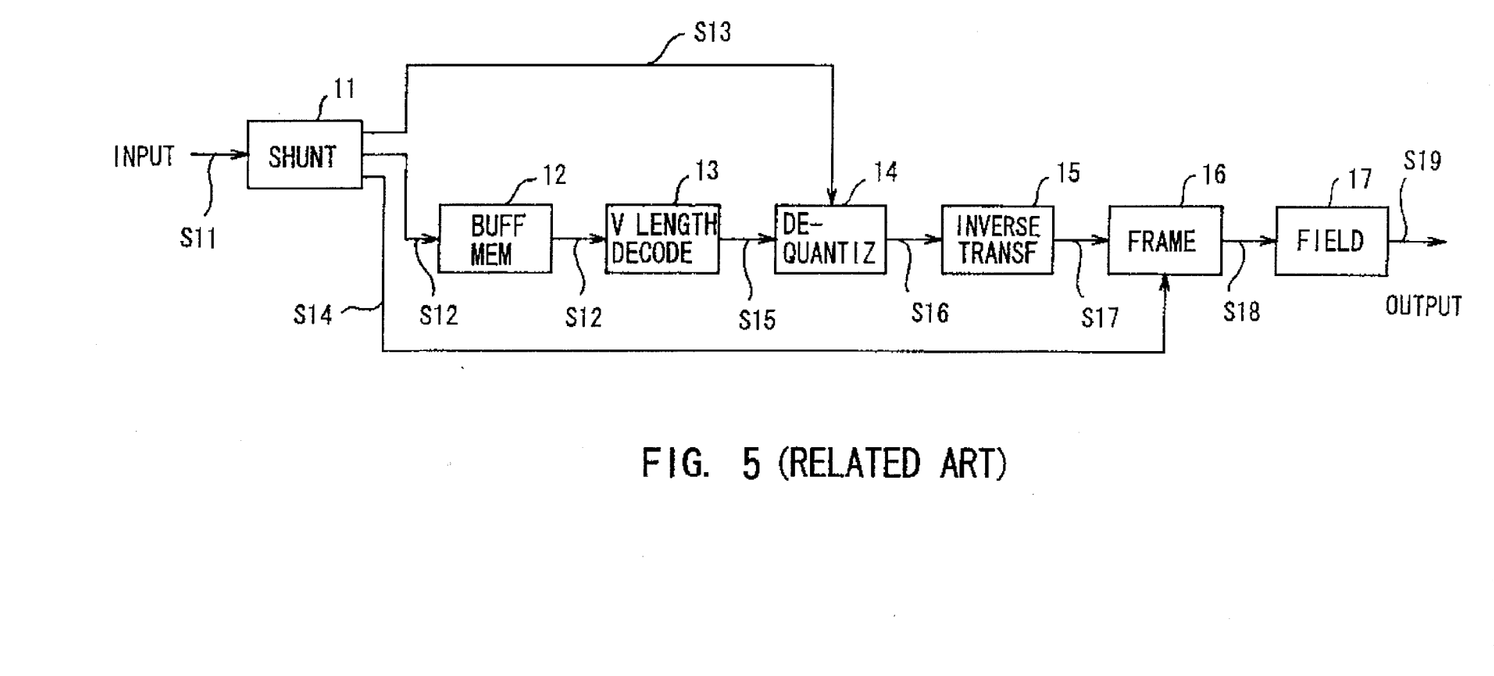
FIG. 5 is a block diagram showing the construction of a picture decoding device using Wavelet inverse transform.

Output data S9 of the picture coding device is inputted to the picture decoder as shown in FIG. 5 as input data S11 and is decoded. More specifically, in the picture decoder the input data S11 is inputted to a shunt circuit 11. The shunt circuit 11 separates quantization coefficient S12 which is variable length coded from the input data S11, and quantization step size information S13 and blocking shifting information S14 and outputs them.

The quantization coefficient S12 which is variable length coded is inputted to a variable length decoder 13 via a buffer memory 12 and variable length decoded to become quantization coefficient S15 and is inputted to a dequantizer 14. The dequantizer 14 dequantizes the quantization coefficient S15 according to the quantization step size information S13 and the resultant dequantization coefficient S16 is inputted to an inverse transform circuit 15 and inverse transformed to become restored picture signal S17.

Figure 6:
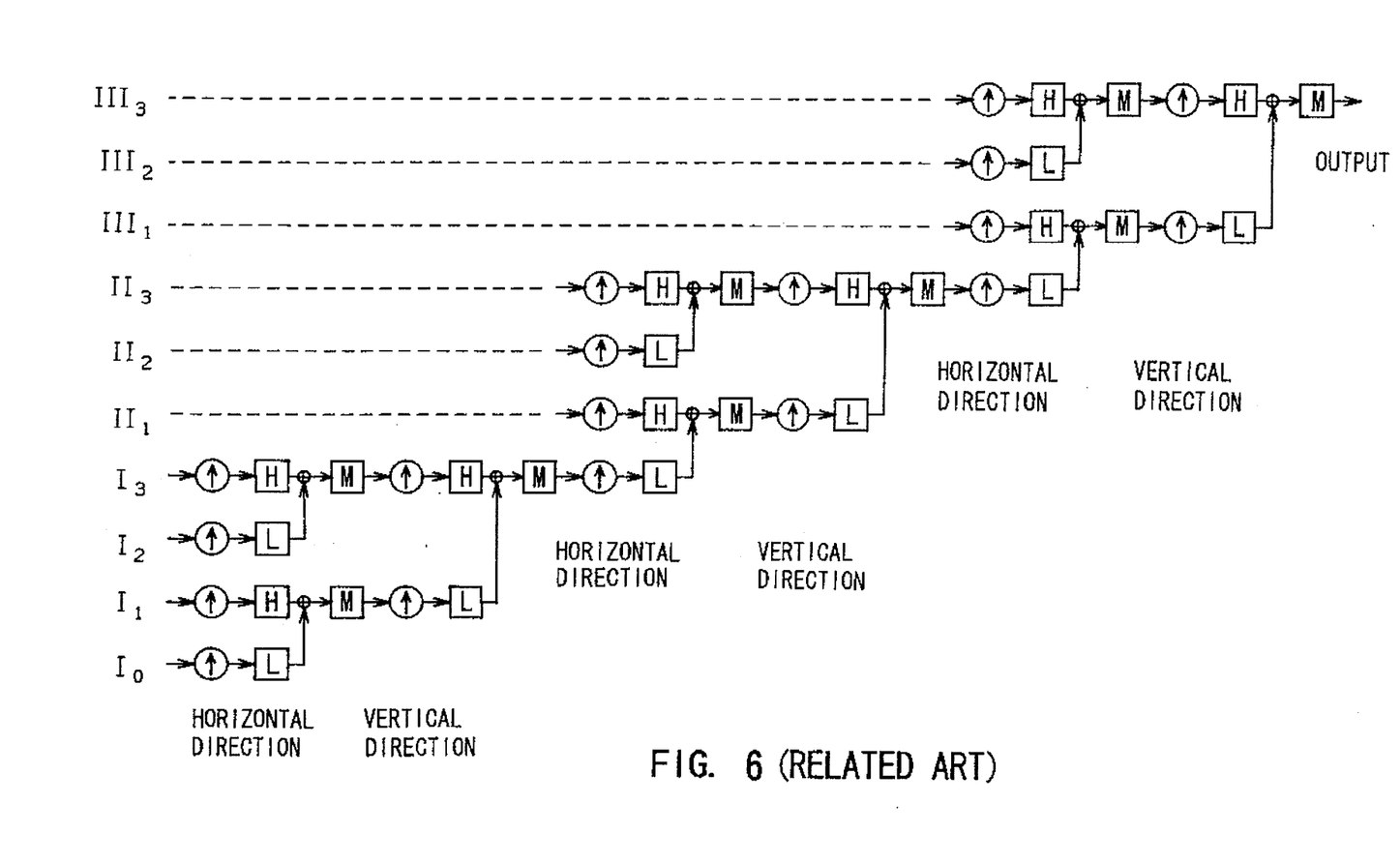
FIG. 6 is a connection diagram showing the construction of two dimensional Wavelet inverse transform circuit.

The inverse transform circuit 15 is composed of two-dimensional Wavelet inverse transform circuit as shown in FIG. 6, and by repeating data reconstruction operation on high frequency elements successively after performing up-sampling to insert zero between each sample of low frequency components and high frequency components, performs, for example, inverse transform as shown in FIG. 4 and restores picture data S17.

The picture data S17 restored at the inverse transform circuit 15 is returned to framing picture signal S18 according to block shifting information S14 at the framing circuit 16 and is returned to field scanning picture signal S19 at a field circuit 17 from which it is outputted as restored picture signal S19 which is the output of the picture decoding device.

However, in the case of picture coding and picture decoding as described above, the conventional apparatus is effective on picture patterns on both extremities of vigorous motion picture patterns and almost still picture patterns. But there has been a problem that effective compressibility and visual picture quality could not necessarily be improved for intermediate picture patterns containing slow movement.

Moreover, since there are cases where visible distortion occurs on the border of the intra-frame coded block and the intra-field coded block, the conventional apparatus has not been sufficient as a coding method for coding picture signals of high picture quality. Furthermore, in the case of simple decoding in utilizing the low frequency coefficients, it was unavoidable that picture decoding device became complicated and large sized since the blocking format of the low frequency coefficients are different in the intra-field coding and intra-frame coding.

Furthermore, in the picture coding device, the judging circuit to judge shifting of memory and block to be used at the framing circuit is large in scale and in the case where the device scale of the coding side is strictly restricted, it has been difficult to obtain small sized device allowing for simple decoding, such as a monolithic camera video tape recorder.

SUMMARY OF THE INVENTION

In view of the foregoing, an object of this invention is to provide a picture signal coding/decoding method and a picture signal coding/decoding device which are capable of improving compressibility and visual picture quality on picture patterns whereon the correlation in the fields of high frequency decreases with slow movement and correlation in the fields of low frequency remains.

The foregoing object and other objects of the invention have been achieved by the provision of a picture signal coding/decoding method for quantizing and transmitting as well as component separate coding the picture signal wherein one frame is constructed by the first field and the second field, in which by utilizing the picture signal of the first and second fields, intra-field component. Coded in each field and the high frequency coefficient of the first and second field to be obtained as a result of the coding are quantized and transmitted respectively. Coefficient block is constructed combining the low frequency coefficients of the first and second fields and furthermore, component separate coding is performed on the coefficient block data and the resultant coefficient data is quantized and transmitted.

Furthermore, according to this invention, in the case where the coefficient block data is constructed by combining the low frequency coefficients for two fields, the coefficient block data is constructed by determining the block construction method according to the correlation of coefficient valves of low frequency coefficients for two fields. Another coefficient is obtained by component separate coding the coefficient block data, which is transmitted with information to show the block construction method.

Moreover, according to this invention, in the picture signal coding/decoding method on which the picture signal in which one frame is constructed by the first and second fields is intra-field component separate coded in each field respectively, and the resultant high frequency coefficient for two fields is quantized and transmitted, and simultaneously, the coefficient block constructed by low frequency coefficients for two fields is further component separate coded and the coefficient data obtained as a result of coding is quantized and transmitted. The coded data is decoded, quantization coefficient contained in quantization coefficient block data composed of quantization coefficients corresponding to low frequency components of the first and second fields is dequantized and simultaneously, inverse transformed and coefficient block combined low frequency coefficients of the first and second fields is restored and quantization coefficient corresponding to high frequency components of the first and second fields is dequantized. In utilizing restored low frequency coefficient for two fields and dequantized high frequency coefficient for two fields, inverse transformation is performed in each field and the picture signal of the first and second fields are restored.

According to this invention, high frequency coefficient for two fields is quantized and transmitted as data and simultaneously, coefficient block data which is constructed by the prescribed block construction method according to the correlation of coefficient values of low frequency coefficients for two fields is further component separate coded. In the case where a coefficient to be obtained as a result of coding is quantized and transmitted with information to show the block construction method, quantization coefficient contained in the quantization block comprising quantization coefficient of low frequency components of the first and second fields is dequantized and simultaneously inverse transformed and coefficient block data combining low frequency coefficients of the first and second fields is restored. Coefficients contained in that coefficient block data are separated in the low frequency coefficient of the first field and the low frequency coefficient of the second field according to information to show the block construction method transmitted with data.

According to this invention, the picture signal coding/decoding device for quantizing and transmitting as well as component separate coding the picture signal in which one frame is constructed by the first field and second field, comprises, an intra field transform circuit for component separate coding in each field the picture signal of the first and second fields, low frequency coefficient block construction means for constructing coefficient block data combining low frequency coefficients of the first and second fields obtained as a result of coding of the intra field transform circuit, an intra frame transform circuit for further component separate coding on the coefficient block obtained from low frequency coefficient block construction means, and quantization transmission means for quantizing and transmitting a coefficient obtained as a result of coding of the intra frame transform circuit and high frequency coefficient of the first and second fields obtained as a result of coding of the intra field transform circuit.

According to this invention, a block construction method determination device for determining a block construction method of coefficient block according to the correlation of coefficient valves of low frequency coefficients for two fields is provided, and in the low frequency coefficient block construction means, the coefficient block is constructed according to the block construction method on low frequency coefficients and in the case where a coefficient obtained as a result of component separate coding, the coefficient block data is quantized and transmitted and information to show the block construction method is also transmitted.

According to this invention, the picture signal in which one frame is constructed by the first and second fields is intra field component separate coded in each field respectively and high frequency coefficient for two fields obtained as a result of coding is quantized and transmitted and simultaneously, coefficient block data formed by low frequency coefficients for two fields are further component separate coded and the resultant coefficient is quantized and transmitted. And in the picture signal transmission device for decoding data the first dequantization method for dequantizing quantization coefficients contained in the quantization block comprising quantization coefficients according to low frequency components of the first and second fields, an intra frame transform circuit for restoring coefficient block data combining low frequency coefficient of the first and second fields upon inverse transforming a coefficient dequantized by the first dequantization method, the second dequantization method for dequantizing quantization coefficients respectively according to the high frequency component of the first and second fields, an intra field coefficient block construction means for constructing the intra field coefficient block data in utilizing low frequency coefficient for two fields which is restored by the intra frame inverse transform circuit and high frequency coefficient for two fields dequantized by the second dequantization method, and an intra field inverse transform circuit for restoring picture signal of the first and second fields after intra field inverse transforming in each field in utilizing intra field coefficient block data outputted from the intra field coefficient block construction means is provided.

According to this invention, high frequency coefficient for two fields is quantized and transmitted as data and simultaneously, coefficient block data constructed by the prescribed block construction method according to the correlation of coefficient values of low frequency coefficients for two fields is further component separate coded. In the case where a coefficient to be obtained as a result of coding is quantized and transmitted with information to show block construction method, intra field coefficient block data is constructed based on information to show block construction method in the intra field coefficient block construction means by in utilizing low frequency coefficient for two fields restored at the intra frame inverse transform circuit and high frequency coefficient for two fields dequantized at the second dequantization methods.

The intra field component separate coding is performed on the first and second fields of picture signal respectively in each field, and by preventing the effect of movement in the field in advance, declining of compressibility by the movement is avoided, and a new coefficient block is formed by the resultant low frequency components for two fields. And further component separate coding in the frame, low frequency components which are not easily affected by the slow movement are coded efficiently, and as a result, compressibility on the picture containing slow movement can be increased.

Moreover, by performing reconstruction on the coefficient block data comprising low frequency components of two fields which are component separate coded in the frame, simple decoding to restore frame picture can be easily performed and furthermore, since the separation format of low frequency performed in the frame is so arranged that the electric power centers on the low frequency coefficient according to the correlation of coefficient value of low frequency of two fields the efficiency of coding can be remarkably improved.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 7:
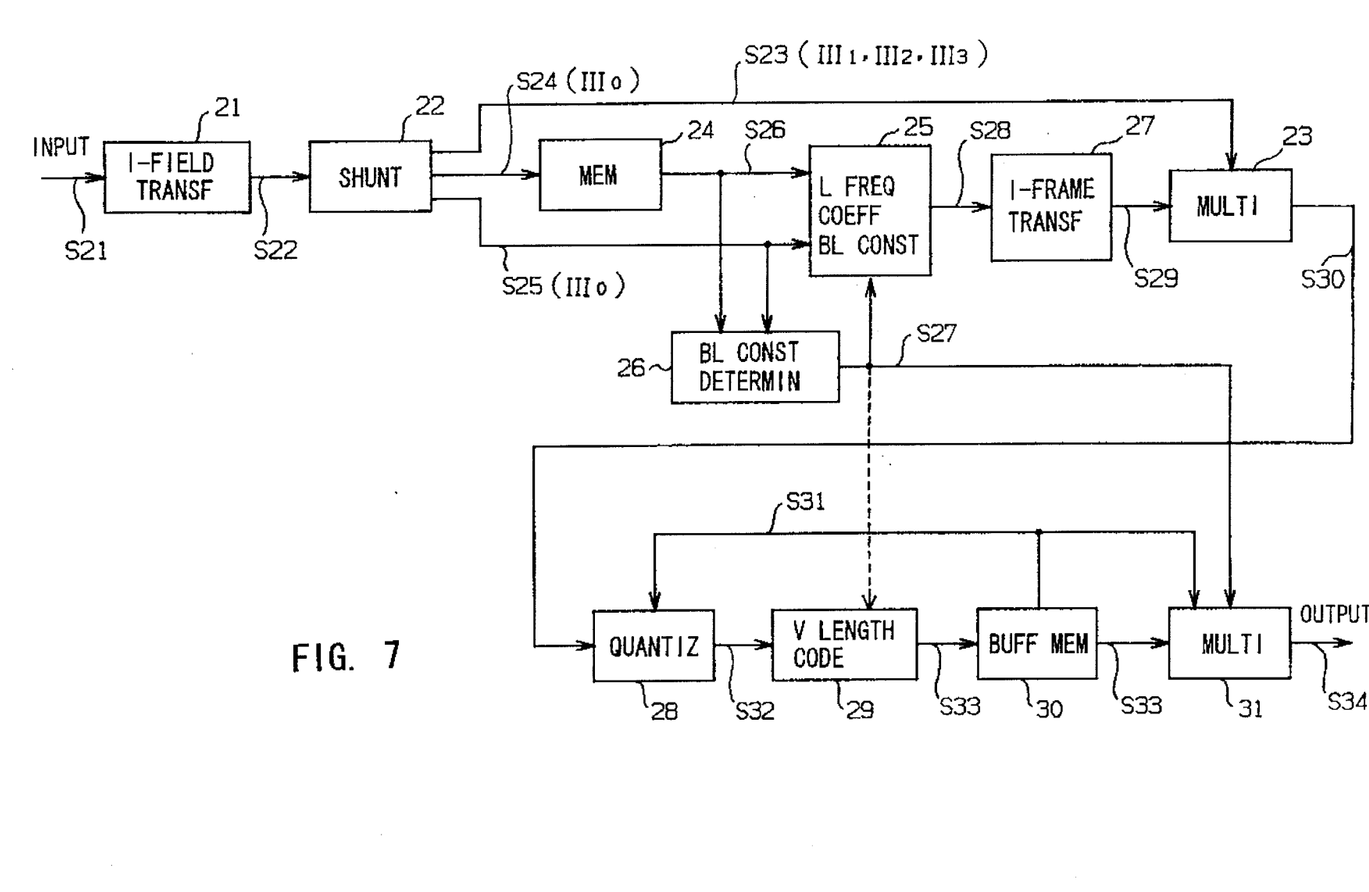
FIG. 7 is a block diagram showing the construction of picture coding device applied a picture signal transmission method and a picture signal transmission device according to this invention.
Figure 8:
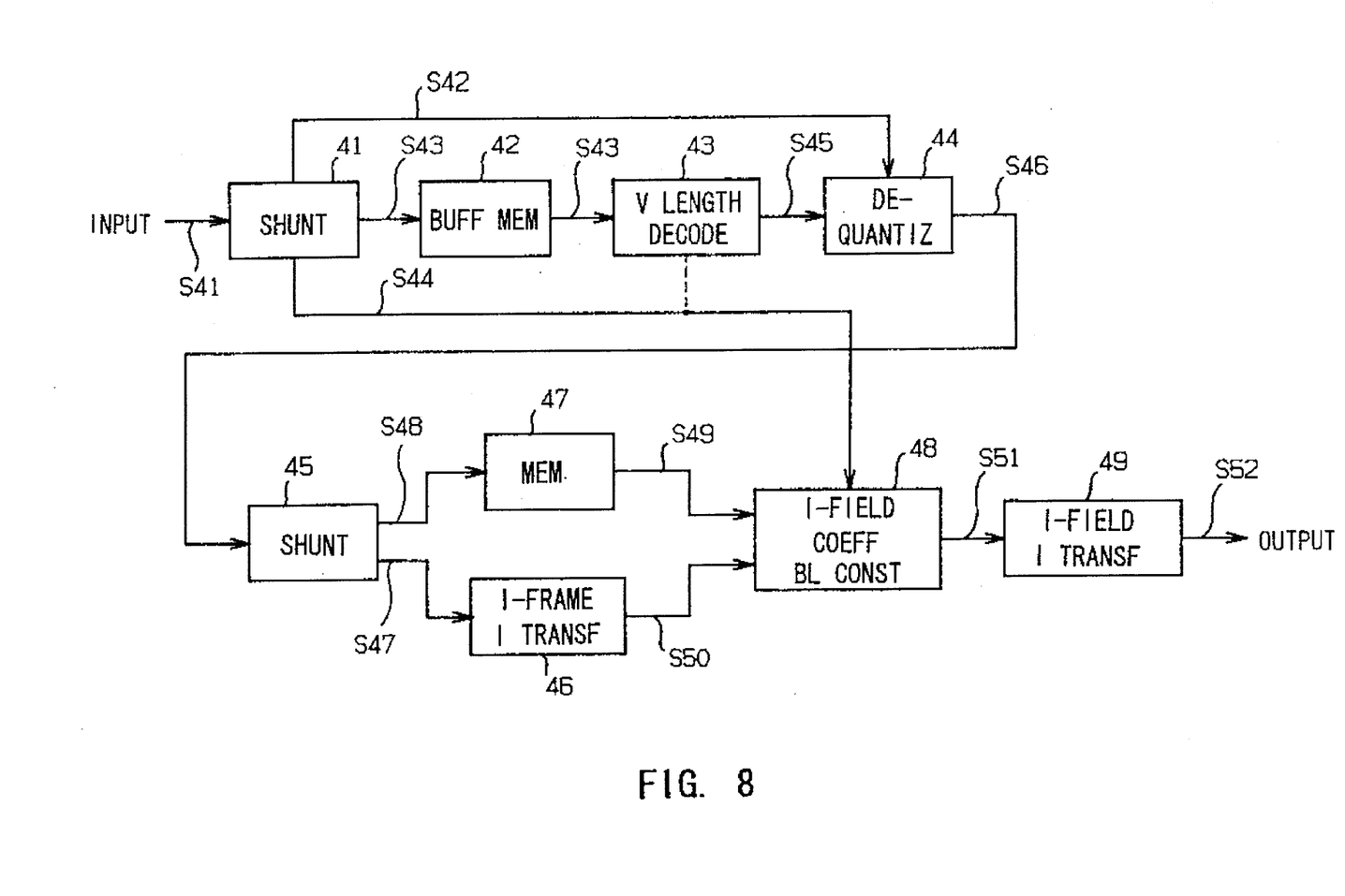
FIG. 8 is a block diagram showing the construction of a picture decoding device applied a picture signal transmission method and a picture signal transmission device according to this invention.
Figure 9:
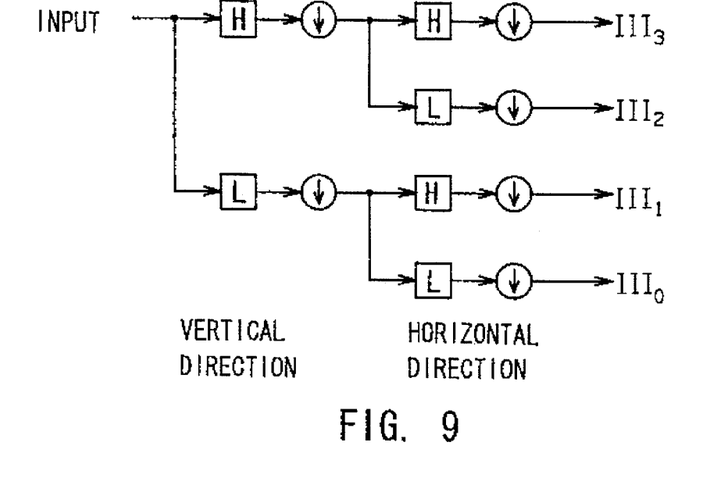
FIG. 9 is a connection diagram showing the construction of intra field transform circuit.
Figure 10:
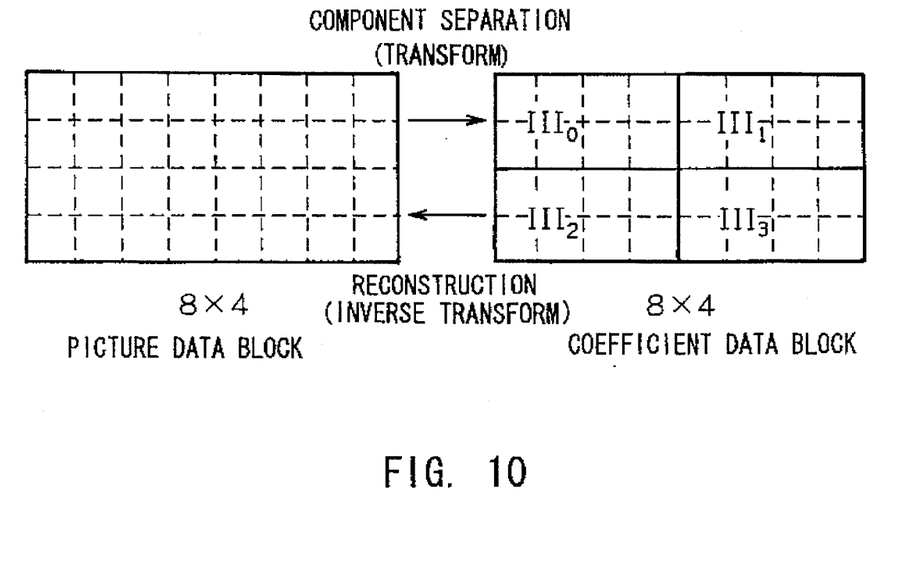
FIG. 10 is a schematic diagram illustrating the intra field component separate coding and reconstruction of picture signal.

Preferred embodiment of this invention will be described with reference to the accompanying drawings:

FIGS. 7 and 8 show a picture coding device and a picture decoding device used is the picture signal transmission method and the picture signal transmission device according to this invention. In this case, component separate coding is Wavelet transform using Haar function and processed in each block of 8 picture elements×4 lines in the field. In this picture coding device, input picture signal S21 is inputted firstly to the intra field transform circuit 21. The intra field transform circuit 21 is constructed by, as shown in FIG. 9, Wavelet transform circuit, and performs component separate coding, i.e., transform, for the first and second fields of picture signal S21 formed by 8 picture elements×4 lines block in the field respectively as shown in FIG. 10 and the resultant coefficient S22 is outputted.

The each coefficient S22 of the first and the second field outputted from the intra field transform circuit 21 is inputted to a shunt circuit 22 and coefficient S23 comprising three kinds of high frequency components $III_1$, $III_2$, and $III_3$ in the coefficient S22 is inputted to a multiplexing circuit 23, and the first field coefficient S24 in the coefficient of one type of low frequency component $III_0$, is stored once in the memory 24 which delays for time required for processing of second field and the second field coefficient S25 in the coefficient of one type of low frequency component $III_0$ is inputted to a low frequency coefficient block construction circuit 25.

Figure 11A:
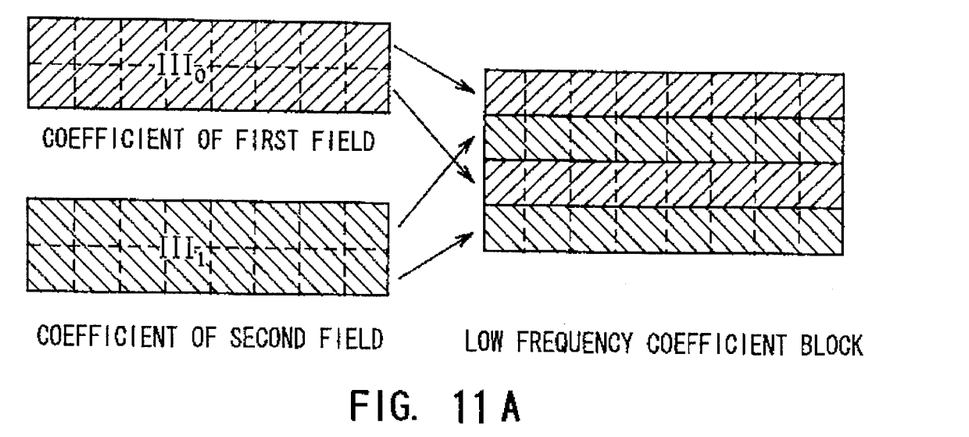
FIGS. 11A and 11B are schematic diagrams illustrating the construction method of low frequency coefficient block.
Figure 11B:
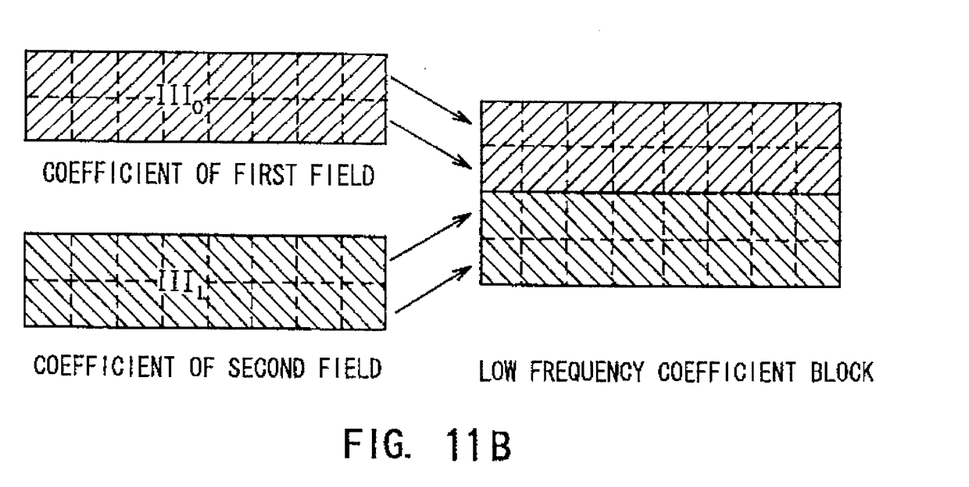

In the low frequency coefficient block construction circuit 25, the low frequency coefficient block is constructed by the block construction method in utilizing the first field low frequency coefficient S26 read out from memory 24 and the second field low frequency coefficient S25, as shown in FIGS. 11A and 11B. In the case of this embodiment, which block construction method would be applied for constructing the low frequency coefficient block is determined by the block construction information S27 inputted from the block construction determination circuit 26.

In this block construction determination circuit 26, the correlation of coefficient values between the first field low frequency coefficient S26 and the second field low frequency coefficient S25 read out from the memory 24 is calculated and the block construction method in which the electric power centers on more low frequency coefficients is determined and the block construction information S27 is outputted according to the block construction method.

In practice, in the case where the block construction method shown in FIG. 11B is used in place of the block construction method shown in FIG. 11A, for example, if Haar function is used for separation and reconstruction, it becomes equivalent to the case where the separation in the vertical direction of the low frequency coefficient block constructed is performed once more in the field and it becomes very effective low frequency separation for the picture pattern with vigorous motion and having poor inter field correlation.

Figure 12:
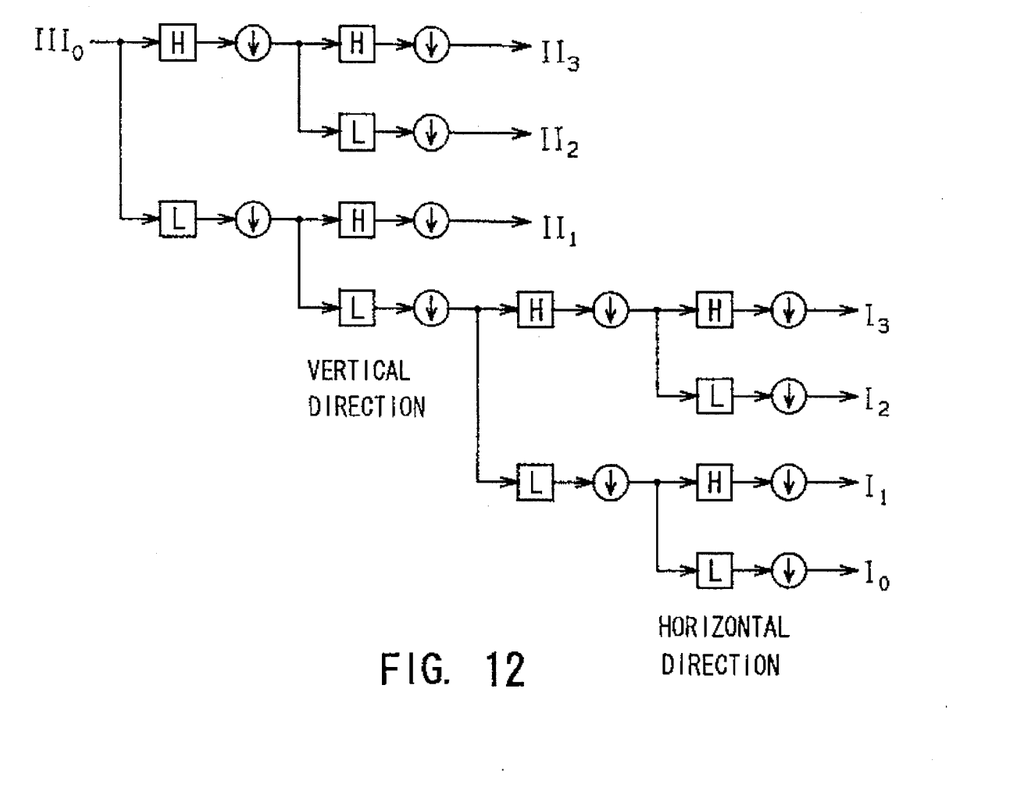
FIG. 12 is a connection diagram showing the construction of intra frame transform circuit.
Figure 13:
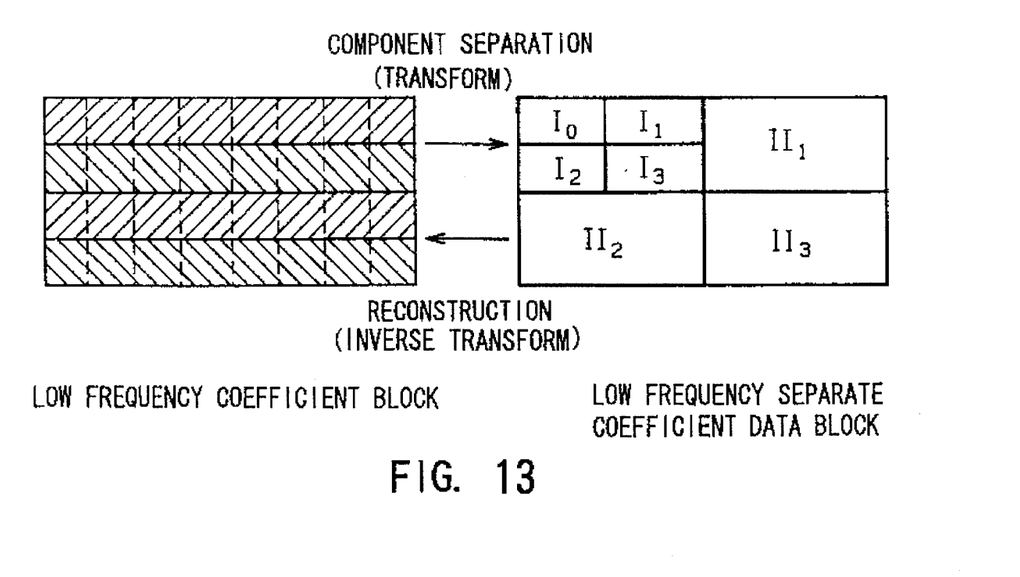
FIG. 13 is a schematic diagram illustrating the intra frame component separation and reconstruction on low frequency coefficients.

Coefficient block data S28 corresponding to low frequency coefficient block constructed at the low frequency coefficient block construction circuit 25 is inputted to an intra frame transform circuit 27. The intra frame transform circuit 27 is constructed by Wavelet transform circuit as shown in FIG. 12 for example, and performs component separate coding i.e., transform as shown in FIG. 13 on coefficient block data S28 corresponding to the low frequency coefficient block, and the resulting coefficient S29 is outputted to a multiplexing circuit 23.

The multiplexing circuit 23 performs time division multiplex on the coefficient S23 of three kinds of high frequency components obtained upon intra field transform and the coefficient S29 obtained upon low frequency coefficient block transformed in the frame, and the resultant coefficient S30 is outputted to a quantizer 28. In the quantizer 28, the coefficient S30 is quantized according to the accuracy of quantization to be determined by the quantization step size information S31 which is determined by the amount of storage of the buffer memory 30, and becomes quantization coefficient S32.

The quantization coefficient S32 is inputted to a variable length coding circuit 29 and is variable length coded combining Huffman coding and zero run-length coding as before, the resultant variable length coding quantization coefficient S33 is inputted to the multiplexer 31 after the amount of information is smoothed through the buffer memory 30 for smoothing the generation information amount, and here it is multiplexed to block construction information S27 and quantization step size information S31 and is outputted as output data S34 of picture coding device.

On the other hand, in the picture decoding device, output data S34 of the picture coding device is inputted as input data S41 to the shunt circuit 41 and is outputted upon being shunted to quantization step size information S42, block construction information S44, and quantization coefficient variable length coded S43. The variable length coded quantization coefficient S43 is inputted to the buffer memory 42 and the output S43 of this buffer memory is inputted to a variable length decoding circuit 43 and is variable length decoded to become quantization coefficient S45.

The quantization coefficient S45 becomes dequantization coefficient S46 being dequantized according to the quantization step size information S42 at a dequantizer 44 and is inputted to a shunt circuit 45. At the shunt circuit 45 dequantization coefficient S46 is shunted to low frequency separate coefficient S47 and the high frequency separate coefficient S48. The low frequency separate coefficient S47 is inputted to intra frame inverse transform circuit 46, and the high frequency separate coefficient S48 is stored at a memory 47 once and is inputted to an intra field coefficient block construction circuit 48 as data S49 delayed for the prescribed time.

Figure 14:
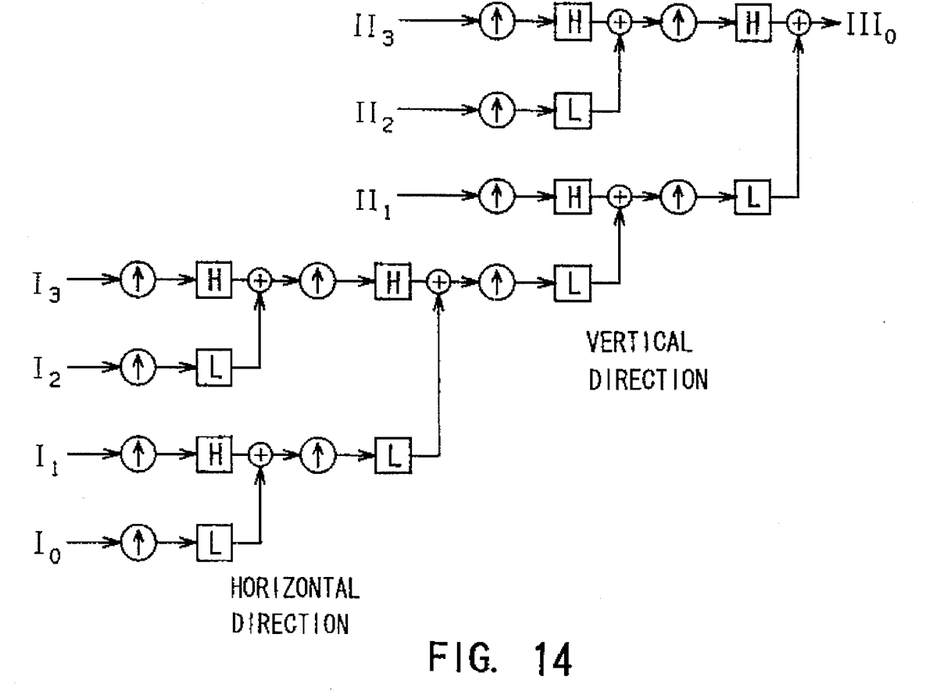
FIG. 14 is a connection diagram showing the construction of intra frame inverse transform circuit.

The intra frame inverse transform circuit 46 is constructed by Wavelet inverse transform circuit as shown in FIG. 14, and performs reconstruction, i.e., inverse transform, on the low frequency separate coefficient S47 as shown in FIG. 13, and inputs the resulting low frequency coefficient block data S50 to an intra field coefficient construction circuit 48.

In the intra field coefficient block construction circuit 48, the low frequency coefficient block data S50 is separated into the respective low frequency coefficient data of the first and second field based on the block construction information S44 inputted from the shunt circuit 41 and, in utilizing the low frequency coefficient data and the high frequency separate coefficient data S49 inputted from the memory 47, the first and second field intra-field coefficient data block is constructed and the data S51 is outputted to an intra field inverse transform circuit 49.

Figure 15:
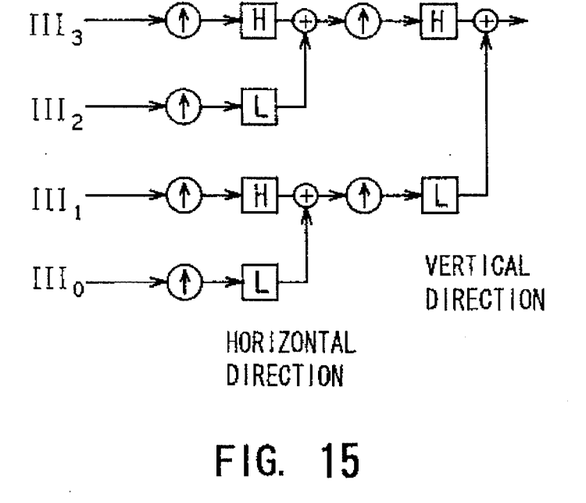
FIG. 15 is a connection diagram showing the construction of intra field inverse transform circuit.

The intra field inverse transform circuit 49 is constructed by Wavelet inverse transform circuit as shown in FIG. 15, and performs reconstruction, i.e., inverse transform, as shown in FIG. 10 for respective intra field coefficient blocks of the first and second fields, and thus, the picture signal is restored and outputted as output picture signal S52 of the picture decoding device.

With this arrangement, the high frequency component separate coding is performed in the field and the low frequency component separate coding is performed in the frame, and by improving the capacity for picture patterns containing slow movement, the visible distortion on the slowly moving restored picture is improved and thus improving the visual picture quality and the transmission of high picture quality picture signal can be performed.

Furthermore, since it becomes possible to perform easily the simple decoding using only low frequency coefficients with the simple device, high velocity simple reproduction, etc. in the video tape recorder or disc device can be realized easily. Moreover, by pluralizing the separating format of low frequency to be performed in the frame and shifting and using a plurality of format, the coding efficiency change by the movement amount of input picture signal is suppressed and simultaneously, overall coding efficiency can be further improved and the transmission of higher picture quality picture signal can be performed.

According to the construction described above, in the first and second fields of picture signal, component separate coding is performed in each field respectively, and by preventing the effect by the movement between fields, the declining of compressibility by the movement is avoided, and furthermore, a new block is constructed by the resultant low frequency component of the two fields and further component separate coding in the frame, the low frequency components which are not easily affected by the slow movement can be efficiently coded, and as a result, the picture signal transmission method and picture signal transmission device which are capable of increasing the compressibility for the picture containing the slow movement can be obtained.

According to the construction described above, by performing the reconstruction on the block comprising low frequency components of two fields which are intra frame component separate coded, the simple decoding to restore frame picture easily can be performed, and furthermore, since the separation format of low frequency to be performed in the frame is so arranged that the electric power centers at the low frequency coefficient in accordance with the correlation of coefficient values of low frequency components of two field, the picture signal transmission method and picture signal transmission device capable of improving further the efficiency of coding can be obtained.

Moreover, the embodiment discussed above has dealt with the case of performing the component separate coding of picture signal in each field using Haar function in every block of 8 picture elements×4 lines. However, the block size is not only limited to the above, but also various sizes, e.g., 8 picture elements×8 lines, may be selected. In this connection in case of performing component separate coding in every block of 8 picture elements×8 lines, the construction of low frequency coefficient block may be selected from various construction methods accordingly, the same effects as those of the embodiment discussed above can be obtained.

Furthermore, the embodiment described above has dealt with the case of component separate coding of picture signal by Wavelet transform using Haar function. However, the transform method is not only limited to the above, but is also widely applicable, such as to the sub-band coding which divides picture signal to multiple components and coding.

In addition, the embodiment described above has dealt with the case of variable length coding only the quantization coefficient. However, this invention is not limited to this, but is also capable of variable length coding the quantization coefficient and the block construction information. In this case, the block construction information is coded/decoded through the route indicated by a broken line in FIGS. 7 and 8.

According to the present invention as described above, in the case where the picture signal in which one frame is constructed by two fields is component separate coded and picture information is compressed and transmitted, the component separate coding of high frequency is performed in the field and the component separate coding of low frequency is performed in the frame, and by improving the capacity for picture pattern containing slow movement, the visible distortion of slowly moving decoded picture can be improved and the picture signal transmission method and picture signal transmission device capable of improving the visual picture quality and transmitting high picture quality picture signal can be obtained.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A picture signal coding method for coding a picture signal of one frame including a first field and a second field, comprising the steps of:

receiving said picture signal, said picture signal having frequency components;

component separating said picture signal of said first field and said second field to generate high and low frequency coefficients of said first field and said second field;

providing said component separated high and low frequency coefficients of said first field and said second field, respectively;

quantizing said component separated high frequency coefficients of said first field and said second field to generate first quantization coefficients;

combining said component separated low frequency coefficients of said first field and said second field to compose coefficient blocks;

component separating said coefficient blocks;

quantizing said component separated coefficient blocks to generate second quantization coefficients; and coding said first and said second quantization coefficients.

2. The picture signal coding method according to claim 1, further comprising the steps of:

changing a construction of said coefficient blocks based on a correlation between the low frequency coefficients of said first field and the low frequency coefficients of said second field; and coding information representing the construction of said coefficient blocks.

3. The picture signal coding method according to claim 2, wherein when the correlation is high, the low frequency coefficients of said first field and said second field are interlaced to compose said coefficient blocks, and when the correlation is low, the low frequency coefficients of said first field and said second field are separated to compose said coefficient blocks.

4. A picture signal decoding method for decoding a picture signal of one frame including a first field and a second field having been frequency component separate coded, comprising the steps of:

receiving the coded picture signal, said coded picture signal having high and low frequency quantization coefficients;

dequantizing said low frequency quantization coefficients to generate low frequency separate coefficients;

inverse transforming said low frequency separate coefficients to generate low frequency coefficient blocks;

dequantizing said high frequency quantization coefficients to generate high frequency separate coefficients of said first field and said second field;

composing coefficient blocks of said first and said second field based on said low frequency coefficient blocks and said high frequency separate coefficients of said first field and said second field; and inverse transforming the coefficient blocks of said first field and said second field to restore the picture signal of said first field and said second field.

5. The picture signal decoding method according to claim 4, further comprising the steps of:

separating information representing a construction of said low frequency coefficient blocks from the coded picture signal; and dividing said low frequency coefficient blocks into first field and second field low frequency coefficient blocks based on said information.

6. A picture signal coding device for coding a picture signal of one frame including a first field and a second field, comprising:

receiving means for receiving said picture signal, said picture signal having frequency components;

intra-field transform means for separating the picture signal of said first field and said second field to generate high and low frequency coefficients of said first field and said second field;

blocking means for combining low frequency coefficients of said first field and said second field to compose coefficient blocks;

intra-frame transform means for component separating said coefficient blocks;

quantization means for quantizing high frequency coefficients of said first field and said second field to generate first quantization coefficients and for quantizing said component separated coefficient blocks to generate second quantization coefficients; and coding means for coding said first and said second quantization coefficients.

7. The picture signal coding device according to claim 6, wherein said blocking means changes a construction of said coefficient blocks based on a correlation between the low frequency coefficients of said first field and the low frequency coefficients of said second field, and wherein the coding means further codes information representing the construction of said coefficient blocks.

8. The picture signal coding device according to claim 7, wherein when said correlation is high, said blocking means interlaces the low frequency coefficients of said first field and said second field to compose said coefficient blocks, and when said correlation is low, said blocking means separates the low frequency of said first field and said second field to compose said coefficient blocks.

9. A picture signal decoding device for decoding a picture signal of one frame including a first field and a second field having been frequency component separate coded, comprising:

receiving means for receiving the coded picture signal, said coded picture signal having high and low quantization coefficients;

dequantization means for dequantizing said low frequency quantization coefficients to generate low frequency separate coefficients and for dequantizing said high frequency quantization coefficients to generate high frequency separate coefficients of said first field and said second field;

intra-frame inverse transform means for inverse transforming said low frequency separate coefficients to generate low frequency coefficient blocks;

blocking means for composing coefficient blocks of said first field and said second field based on said low frequency coefficient blocks and said high frequency separate coefficients of said first field and said second field; and intra-field inverse transform means for inverse transforming the coefficient blocks of said first field and said second field to restore the picture signal of said first field and said second field.

10. The picture signal decoding device according to claim 9, further comprising means for separating information representing a construction of said low frequency coefficient blocks from the coded signal, and wherein said blocking means divides said low frequency coefficient blocks into low frequency coefficient blocks of said first field and said second field based on said information.

* * * * *